United States Patent Office 3,243,316
Patented Mar. 29, 1966

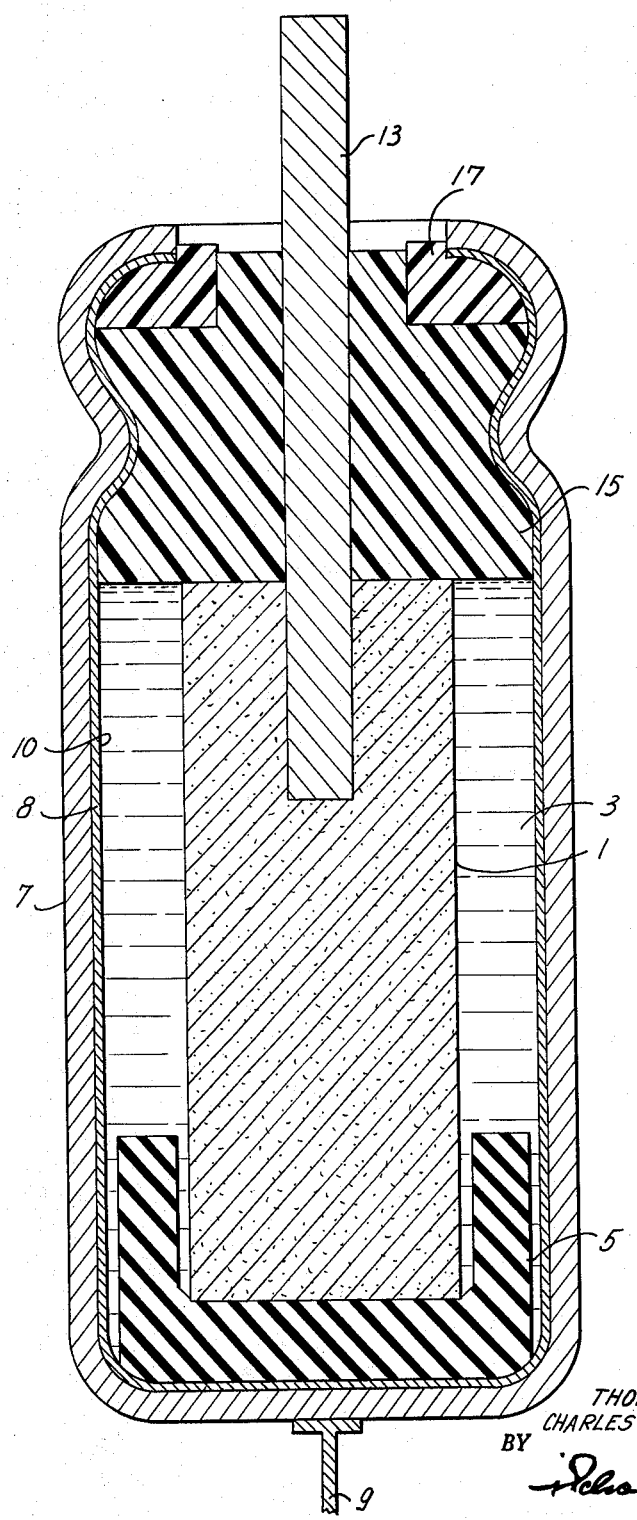

3,243,316
METHOD OF PRODUCING ELECTROLYTIC CAPACITOR WITH COLLOIDAL FILM ON CATHODE
Thomas C. O'Nan and Charles W. Walters, Indianapolis, Ind., assignors to P. R. Mallory & Co., Inc., Indianapolis, Ind., a corporation of Delaware
Filed May 2, 1961, Ser. No. 107,234
2 Claims. (Cl. 117—226)

This invention relates to electrolytic capacitors, and more particularly to an improved tantalum electrolytic capacitor comprising a cathode having a thin film of colloidal non-metallic conductive material deposited thereon to effect cathode depolarization. The invention additionally relates to a method of producing such a film on the surface of a metal container serving as the cathode of such a capacitor.

In sintered powder tantalum anode electrolytic capacitors the cathode area is invariably very small in relation to the anode area. As miniaturization becomes more pronounced, and the capacitance per unit volume is increased, this area ratio becomes even greater. Under these circumstances cathodic polarization phenomena become most pronounced. The effect of cathodic polarization is the introduction of a cathodic capacitance in series with the anodic capacitance, thereby reducing the net capacitance of the capacitor in accordance with the relation $$C_n = \frac{C_a}{1 + C_a/C_c}$$

Where $C_n$ is the net capacitance, $C_a$ is the intrinsic anodic capacitance, and $C_c$ is the cathodic capacitance. This cathodic capacitance may result from formation of an asymmetrically conductive film on a metal cathode or from electrochemically developed insoluble insulating films or gas polarization films on the cathode surface. Various depolarizing means may be employed to circumvent, or at least minimize these effects. The net result of depolarization is to greatly increase the cathodic capacitance so that it does not become a limiting term in the above equation.

Two types of polarization are encountered in normal capacitor usage. These are "static polarization," arising from evolution of hydrogen gas at the cathode due to the passage of steady state direct leakage current through the capacitor; and "dynamic polarization," which results from the alternate passage of charge and discharge current through the cathode-electrolyte junction when the capacitor conducts an alternating ripple current. As disclosed and claimed in Patent 2,616,953, dynamic depolarization of a tantalum electrolytic capacitor may be effected by employing a cathode of either copper or silver. The depolarizing effect may be rendered more effective by maintaining a reservoir of cathode metal ion in the electrolyte, as disclosed and claimed in each of Patents 2,710,369 and 2,778,979. The excess metal ion also provides static depolarization, since it plates out preferentially to hydrogen with passage of direct leakage current. Another depolarization technique, as disclosed and claimed in Patent 2,834,926, is to provide soluble oxidizing and reducing ions in the electrolyte. This achieves both static and dynamic depolarization without involving electrolytic metallic deposition on the cathode, and so is particularly advantageous in highly miniaturized capacitors of extremely small anode-to-cathode spacing. However, the degree of static depolarization in this case is limited by the Faradic equivalent of the depolarizer employed.

Accordingly, an object of the invention is to provide an improved tantalum electrolytic capacitor wherein polarization effects are substantially eliminated for the entire operating life of the capacitor.

A further object is to provide a tantalum electrolytic capacitor wherein cathodic depolarization is simply and economically established to an extent which enables realization of the intrinsic capacitance of the tantalum anode.

A further object is to provide an improved cathode for a tantalum electrolytic capacitor which is substantially non-film forming, non-gassing, inert to chemical attack by the electrolyte, and which establishes very low internal resistance between the electrolyte and the cathode.

A further object is to provide a process for producing a thin adhering film of colloidal carbon on the surface of a metal container suitable for use as the cathode of a tantalum electrolytic capacitor.

An electrolytic capacitor in accordance with the invention comprises a tantalum anode, an acid electrolyte, and a metal cathode having a thin adhering surface film of colloidal non-metallic conductive material deposited thereon, the anode being in electrolytically polarized filmforming surface contact with the electrolyte, and the cathode film being in substantially non-polarizing low resistance contact therewith. The cathodic surface film referred to preferably consists of colloidal carbon particles.

The invention additionally provides a process for preparing a metal container for use as the cathode of an improved tantalum electrolytic capacitor. Such a process comprises, firstly, chemically cleaning the interior surface of the container. It is then filled with a colloidal solution of carbon in a liquid dispersant such as water or preferably alcohol, which wets the interior surface thereof. The container is next drained in an inverted position so as to leave a thin uniform film of the colloidal solution over its interior surface. The final step is to dry and bake the container so as to evaporate the liquid dispersant, thus leaving a thin adhering film of colloidal carbon over the interior surface thereof.

A more complete description of the invention together with additional objects and features thereof is presented in the following specification with reference to the accompanying drawing, which shows in cross-section an illustrative construction of an electrolytic capacitor embodying the teachings of the invention. It should be noted, however, that the actual scope of the invention is pointed out in the ensuing claims.

The illustrated electrolytic capacitor comprises an anode 1 of porous tantalum, such as may be prepared by compacting and sintering tantalum powder by the usual technique of powder metallurgy. The advantage of porous construction is, of course, that greatly multiplied surface area is obtained within a relatively small volume. Surrounding anode 1 and in surface contact therewith is an acid electrolyte 3. This may be either hydrochloric or sulfuric acid, or in general any acid or acid anion capable of forming a polarized electrolytic film on the surface of anode 1 when the anode is subjected to a positive potential with respect to the electrolyte. Anode 1 is supported in an insulating cup 5 which may be of a substituted polyethylene copolymer material, the inner diameter of the cup slightly exceeding the outer diameter of the anode so as to permit electrolyte 3 to remain in contact with the portion of the longitudinal surface of the anode contained within the cup. Cup 5, in turn, is supported at the bottom of a cylindrical container 7 of which the interior surface 8 constitutes the cathode of the complete capacitor. Container 7 should be composed of a highly conductive metal, any of the metals in the group consisting of copper, silver and gold having been found equally satisfactory. A conductive metal rod 9 is welded to the exterior bottom surface of container 7 to serve as a negative terminal for the complete capacitor.

In accordance with the invention, a thin adhering film 10 of colloidal non-metallic conductive material is provided on the inner surface or cathode 8 of container 7. More specifically, film 10 may be the residue of colloidal carbon deposited by coating the cathode 8 with a colloidal solution of carbon in a liquid dispersant which wets the cathode surface, and then evaporating the liquid dispersant. The dispersant may be water or alcohol, alcohol being preferable because its lower surface tension results in superior wetting ability. Colloidal solutions of this type are commercially available, being made, for example, by the Acheson Colloid Company under the trade names "Aqua-Dag" and "Alcohol-Dag." Of course, other liquid dispersants capable of forming colloidal solutions of carbon may also be employed. It is also possible to effect deposition of the colloidal carbon film on cathode 8 by direct application of micronized graphite or acetylene blacks thereto. However, applicants have found that such formulations do not provide as good a carbon deposit as the described liquid colloidal solutions.

Container 7 may be prepared for use as the cathode of applicants' improved tantalum electrolytic capacitor by a process which comprises, firstly, chemically cleaning the interior surface thereof. The specific cleaning procedure best employed depends on the metal of which the interior surface of the container is composed and its prior history. In the case of silver cleaning may be effected by vapor degreasing with a chlorinated solvent. This can be followed by etching either electrolytically or with acids such as nitric acid or a mixture of sulfuric acid and bromine. Alternatively, it has been found satisfactory in lieu of etching after the vapor degreasing to heat the container to about 300° C. in air for between one-half and one hour. After completing the cleaning operation, the container is filled with a colloidal solution of carbon in a liquid dispersant which wets the interior surface thereof. As already stated, this is preferably Alcohol-Dag. It has also been found advantageous to mix the colloidal solution with ethanol in equal parts by weight. With an Alcohol-Dag solution identified as Acheson Colloid No. 154, for example, this will result in a mixture containing about 10% by weight of carbon. The filled container is then allowed to drain in an inverted position, leaving a thin uniform film of the colloidal solution over the interior or cathode surface 8. The last step in preparing container 7 is to dry and bake it so as to evaporate the liquid dispersant and leave a thin adhering film of colloidal carbon over its interior surface. The drying may be effected in air, followed by baking for about one hour at 150° C.

To complete the assembly of the capacitor unit, anode 1 is provided with a terminal rod 13 extending longitudinally therefrom and which is also composed of tantalum. Rod 13 may either be included when the anode material is pressed and sintered, or it may then be formed as an integral part of the anode. In order to seal the capacitor and prevent escape of the electrolyte 3, a gasket 15 of a suitable elastomer is pressed within container 7 against the upper surface of anode 1. Gasket 15 should have good elasticity, be chemically inert to the electrolyte, and should be extrudable to some degree. A suitable gasket material is polytetrafluoroethylene polymer. A sealing ring 17 of relatively rigid insulating material such as polytrifluorochloroethylene is pressed within container 7 against the upper surface of gasket 15, and is provided with an axial aperture through which the excess gasket material extrudes between the ring and rod 13 when the upper portion of container 7 is crimped and the upper edge thereof is pressed down as shown in the drawing. This results in a completely sealed structure wherein anode terminal rod 13 is rigidly held in place by the extruded gasket material.

In the completed capacitor the anode 1 will be in electrolytically polarized film-forming surface contact with the electrolyte 3. That is, an asymmetrically conductive film is formed on the surface of the anode when it is subjected to a positive potential with respect to the electrolyte. This is the potential direction in which energy storage is provided by the capacitor. At the same time, the colloidal cathode film 10 is in substantially non-polarizing low resistance contact with electrolyte 3. This eliminates cathodic electrical losses under a wide variety of operational conditions, including extended periods of operation at high temperatures and high direct voltages. Because of the high electrical conductivity of the film there is no increase in equivalent series resistance, and it additionally protects the cathode from chemical attack by the electrolyte. The substantial absence of polarization effects during operation of the capacitor is due to the large effective cathode area produced by the colloidal character of the film deposited thereon. The film produces dynamic depolarization by promoting electrochemical reversibility of water electrolysis or catalytic recombination of hydrogen and oxygen into water. In addition, static polarization is distributed to such an extent by the large cathode area that it has negligible effect. That is, the cathodic capacitance may be of the order of 10,000 microfarads per square inch. Accordingly, the intrinsic capacitance of the sintered powder tantalum anode is effectively attained even in highly miniaturized capacitors wherein the ratio of anode area to projected cathode area is extremely large.

While the invention has been described with reference to certain specific embodiments thereof, both as to its structure and method, it will be apparent to those skilled in the art that many modifications and variations therefrom may be made without departing from the true teachings and scope of the invention as set forth in the ensuing claims.

What is claimed is:

1. A process for preparing a metal container for use as the cathode of an electrolytic capacitor having a tantalum anode and liquid electrolyte, said process comprising the steps of: chemically cleaning the interior surface of said container; filling the cleaned container with a solution consisting of colloidal carbon in alcohol; draining said container in an inverted position so as to leave a thin uniform film of said colloidal solution over the interior surface thereof; air drying said container; and baking said container for about one hour at about 150° C. so as to evaporate the alcohol and leave a thin adhering film of colloidal carbon over the interior surface thereof.

2. The method according to claim 1 wherein said solution consists of approximately 10 percent by weight of carbon, and the remainder alcohol.

References Cited by the Examiner

UNITED STATES PATENTS

| | | | |
|---|---|---|---|
| 2,085,413 | 6/1937 | Bloomenthal | 317—230 |
| 2,798,988 | 7/1957 | Sparkes | 317—230 |
| 2,936,514 | 5/1960 | Millard | 317—230 |
| 3,014,166 | 12/1961 | Keblusek et al. | 317—230 |
| 3,066,247 | 11/1962 | Robinson | 317—230 |
| 3,082,360 | 3/1963 | Robinson et al. | 317—230 |

JOHN W. HUCKERT, *Primary Examiner.*

JAMES D. KALLAM, GEORGE N. WESTBY,
*Examiners.*